United States Patent
Pryor et al.

(10) Patent No.: US 9,810,217 B2
(45) Date of Patent: Nov. 7, 2017

(54) VEHICLE AND A METHOD OF REDUCING SOUND PRODUCED BY A LIQUID FLUID PUMP

(71) Applicant: GM GLOBAL TECHNOLOGY OPERATIONS LLC, Detroit, MI (US)

(72) Inventors: Bryan K. Pryor, Waterford, MI (US); Bruce A. Tucker, Brighton, MI (US); Karl R. Gilgenbach, Rochester Hills, MI (US); Richard B. Jess, Haslett, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 336 days.

(21) Appl. No.: 14/087,439

(22) Filed: Nov. 22, 2013

(65) Prior Publication Data

US 2015/0147192 A1    May 28, 2015

(51) Int. Cl.
| | |
|---|---|
| F02M 37/04 | (2006.01) |
| F02M 69/02 | (2006.01) |
| F02M 21/02 | (2006.01) |
| F04B 53/00 | (2006.01) |
| F04C 14/22 | (2006.01) |

(52) U.S. Cl.
CPC ....... *F04C 14/226* (2013.01); *F02M 21/0254* (2013.01); *F02M 37/04* (2013.01); *F02M 69/02* (2013.01); *F04B 53/001* (2013.01)

(58) Field of Classification Search
CPC .... F04C 29/06; F04C 15/0053; F04C 14/226; F04B 49/065; F02M 37/04; F02M 69/02; F02M 21/0245
See application file for complete search history.

(56) References Cited

U.S. PATENT DOCUMENTS

| | | | |
|---|---|---|---|
| 6,408,975 B1* | 6/2002 | Bishop | B62D 5/062 180/422 |
| 6,722,342 B2* | 4/2004 | Ogawa | F02D 41/3029 123/305 |
| 2003/0070653 A1 | 4/2003 | Ogawa et al. | |
| 2007/0092380 A1* | 4/2007 | Fulkerson | B05B 7/1454 417/65 |
| 2009/0242290 A1* | 10/2009 | Kobayashi | F16H 61/12 180/65.265 |

(Continued)

FOREIGN PATENT DOCUMENTS

| | | |
|---|---|---|
| CN | 103199695 A | 7/2013 |
| CN | 103228303 A | 7/2013 |

*Primary Examiner* — Devon Kramer
*Assistant Examiner* — Thomas Cash
(74) *Attorney, Agent, or Firm* — Quinn IP Law

(57) ABSTRACT

A vehicle and a method of reducing sound produced by a liquid fluid pump are disclosed. A pump is activated when a predetermined event is detected. A control valve of the pump is operated in one of an initial and a standard mode when the pump is activated. The control valve is operable to allow a gaseous fluid to vent out of the pump when in the initial mode corresponding to the pump being in a first phase. The control valve is operable to allow a liquid fluid to move through the pump when in the standard mode corresponding to the pump being in a second phase. A solenoid of the control valve is energized and de-energized, at a calibrated frequency, in a sequence when in the initial mode to reduce the sound in the pump during the initial mode.

20 Claims, 4 Drawing Sheets

(56) References Cited

U.S. PATENT DOCUMENTS

| | | | | |
|---|---|---|---|---|
| 2010/0313849 A1* | 12/2010 | Stoner | ................. | F02D 41/22 |
| | | | | 123/350 |
| 2013/0164163 A1* | 6/2013 | Ohnishi | ................. | F04C 2/344 |
| | | | | 418/27 |
| 2013/0270471 A1* | 10/2013 | Kamio | ............... | F16K 31/0675 |
| | | | | 251/129.15 |

* cited by examiner

VEHICLE AND A METHOD OF REDUCING SOUND PRODUCED BY A LIQUID FLUID PUMP

TECHNICAL FIELD

The present disclosure relates to a vehicle and a method of reducing sound produced by a liquid fluid pump.

BACKGROUND

Various sounds can be heard when a vehicle is started. For example, when the vehicle has been shut off overnight, fluids, such as oil, can drain out of various lines and components of the vehicle, which then fill with air. When the vehicle is started in the morning, an oil pump begins to pump oil back through various lines and expels the air. As the air is being expelled from the oil pump, a component inside the oil pump can vibrate which creates sound.

SUMMARY

The present disclosure provides a method of reducing sound produced by a liquid fluid pump. A predetermined event is detected via a controller. The pump is activated, via the controller, when the predetermined event is detected. The pump contains a gaseous fluid when in a first phase of the pump and a liquid fluid when in a second phase of the pump. A control valve of the pump is operated in one of an initial operating mode and a standard operating mode when the pump is activated. The control valve is operable to allow the gaseous fluid to vent out of the pump when in the initial operating mode corresponding to the pump being in the first phase. Furthermore, the control valve is operable to allow the liquid fluid to move through the pump when in the standard operating mode corresponding to the pump being in the second phase. A solenoid of the control valve is energized and de-energized, at a calibrated frequency, via the controller, in a sequence when in the initial operating mode to reduce the sound in the pump during the initial operating mode.

The disclosure also provides a vehicle including a liquid fluid pump. The pump contains a gaseous fluid when in a first phase of the pump and a liquid fluid when in a second phase of the pump. The pump includes a control valve, with the control valve including a solenoid. The vehicle also includes a controller in communication with the pump, with the controller including a processor and tangible, non-transitory memory on which is recorded instructions for reducing sound produced by the liquid fluid pump, and wherein the controller is configured to execute the instructions from the memory, via the processor. The controller is configured to detect a predetermined event and activate the pump when the predetermined event is detected. The controller is also configured to operate the control valve of the pump in one of an initial operating mode and a standard operating mode when the pump is activated. The control valve is operable to allow the gaseous fluid to vent out of the pump when in the initial operating mode corresponding to the pump being in the first phase. Furthermore, the control valve is operable to allow the liquid fluid to move through the pump when in the standard operating mode corresponding to the pump being in the second phase. Additionally, the controller is configured to energize and de-energize, at a calibrated frequency, the solenoid of the control valve in a sequence when in the initial operating mode to reduce sound produced by the pump during the initial operating mode.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
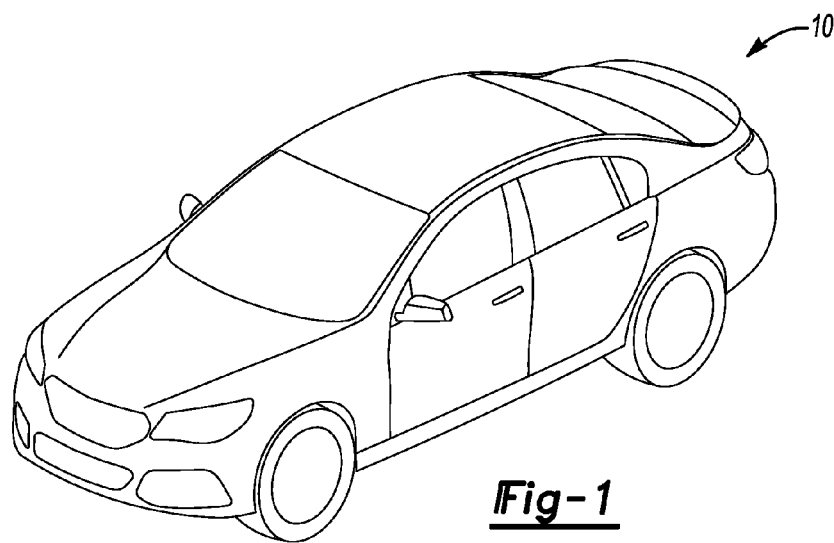
FIG. 1 is a schematic perspective view of a vehicle.

Referring to the Figures, wherein like numerals indicate like or corresponding parts throughout the several views, a vehicle 10 is generally shown in FIG. 1. The vehicle 10 can be an automotive vehicle, such as, a car, a truck, a motorcycle, etc. It is to be appreciated that the vehicle 10 can alternatively be a non-automotive vehicle, such as, a farm vehicle (e.g., a tractor), a marine vehicle (e.g., a boat), an aviation vehicle (e.g., an airplane), etc.

Figure 2:
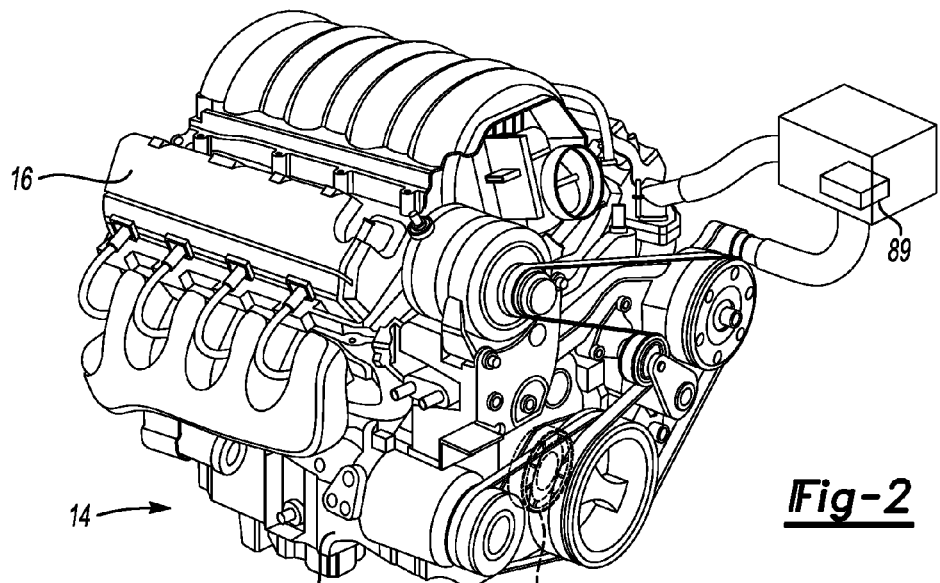
FIG. 2 is a schematic perspective view of an engine of the vehicle of FIG. 1.
Figure 3:
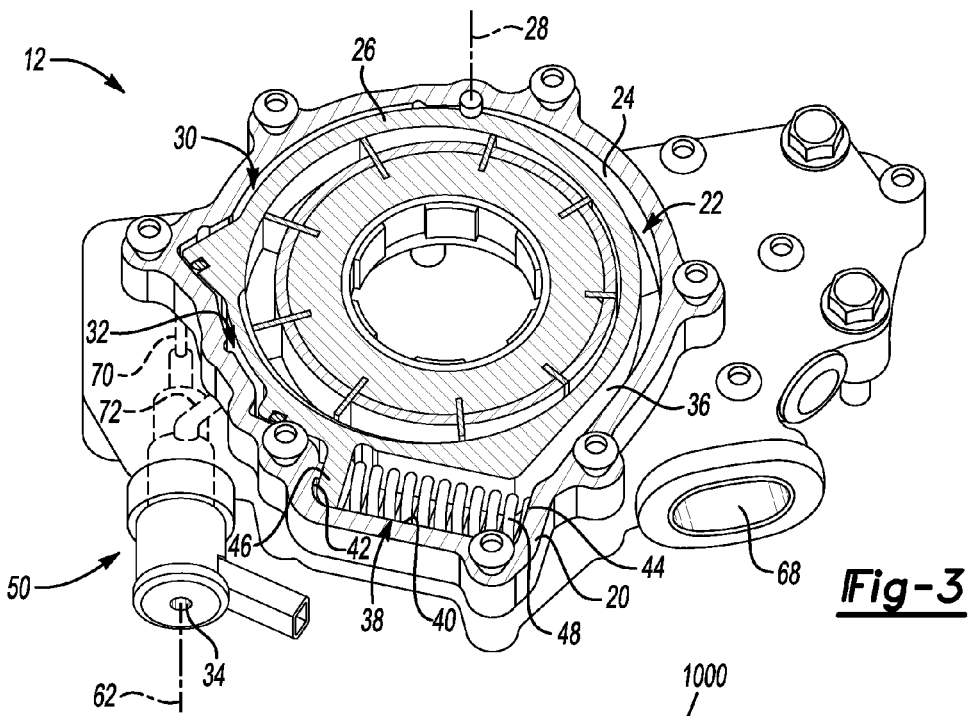
FIG. 3 is a schematic cross-sectional view of a pump, such as an oil pump usable with the vehicle of FIGS. 1 and 2, with a portion of a control valve, such as an oil control valve in phantom lines.

Referring to FIGS. 2 and 3, for example, the vehicle 10 includes a pump 12, such as a liquid fluid pump 12. Generally, the liquid fluid pump 12 delivers liquid fluid, such as oil, coolant, water or any other suitable liquid fluid, to various components of the vehicle 10 or to various components of a non-vehicle as discussed below. It is to be appreciated that the liquid fluid pump 12 can be utilized in conjunction with engines 16, transmissions, suspension systems, etc. of vehicles 10. Additionally, the liquid fluid pump 12 can be utilized in non-vehicle applications, such as in a stationary application including, but not limiting to, irrigation pumps, generators, water pumps, etc. Therefore, the pump 12 can be utilized with vehicles 10 and non-vehicles. One suitable example of the liquid fluid pump 12 is an oil pump 12, and for illustrative consistency, the below discussion refers to the liquid fluid pump 12 as the oil pump 12.

When the oil pump 12 is being operated, the liquid fluid can be delivered from a reservoir 14 to an engine 16 of the vehicle 10 and/or a transmission of the vehicle 10, etc. The oil pump 12 can be disposed inside the engine 16 (as shown schematically in phantom lines in FIG. 2), coupled to the outside of the engine 16 or be disposed in any other suitable location. The liquid fluid can be, for example, oil or any other suitable liquid fluid. Furthermore, the reservoir 14 can be, for example, an oil pan 18 or any other suitable component for storing excess liquid fluid. The oil pump 12 can be a variable displacement pump, such as, a variable displacement vane pump.

The engine 16 can be an internal combustion engine. Examples of internal combustion engines can include spark-ignition engines and compression-ignition engines. Generally, internal combustion engines combust an air and fuel mixture within cylinders to move pistons disposed in respective cylinders, which produces engine or drive torque. Additionally, air flow into the engine 16 can be regulated by a throttle. In other words, adjusting the throttle can increase or decrease the air flow into the engine 16. A fuel control system can adjust the rate that fuel is injected into the cylinders to provide the desired air and fuel mixture to the cylinders and/or to obtain the desired engine torque. In spark-ignition engines, spark initiates combustion of the air and fuel mixture within the cylinders. In compression-ignition engines, compression in the cylinders combust the air and fuel mixture within the cylinders. Generally, spark timing and the air flow are utilized to adjust the engine torque for spark-ignition engines, while fuel flow is utilized to adjust the engine torque for compression-ignition engines. It is to be appreciated that the engine 16 can be designed to operate with gasoline or diesel fuel.

The oil pump 12 contains a gaseous fluid when in a first phase of the oil pump and the liquid fluid when in a second phase of the oil pump. The gaseous fluid can be, for example, air or any other suitable gaseous fluid, and as discussed above, the liquid fluid can be oil or any other suitable liquid fluid. Generally, the first phase occurs when the vehicle 10 has been shut off for a predetermined amount of time. For example, the predetermined amount of time is when the liquid fluid has begun or completely drained out of various lines of the vehicle 10 when the vehicle 10 is off. Furthermore, the liquid fluid also drains out of the oil pump 12 after the predetermined amount of time when the vehicle 10 is off. When this occurs, the oil pump 12 and the lines are filled with the gaseous fluid, e.g., air. When the vehicle 10 is started after the predetermined amount of time has passed, the oil pump 12 begins to pump the liquid fluid from the reservoir 14 back through the lines such that the gaseous fluid is expelled or purged from the lines and the oil pump 12. If less than the predetermined amount of time passes, the gaseous fluid has not entered the lines or the oil pump 12, and the oil pump 12 will be in the second phase when the vehicle 10 is started. These phases will be discussed further below.

Continuing with FIG. 3, the oil pump 12 can include a housing 20 defining an aperture 22 such that the housing 20 presents an inner wall 24 adjacent to the aperture 22. The oil pump 12 can further include a movable member 26 disposed in the aperture 22. For example, the movable member 26 can pivot about a pivot axis 28 inside the aperture 22. As such, the movable member 26 is movably secured to the housing 20, and more specifically, movably secured to the inner wall 24.

Again, continuing with FIG. 3, the housing 20 and the movable member 26 cooperate to define a first chamber 30 and a second chamber 32 spaced from each other. The first chamber 30 can be utilized when the oil pump 12 is operating in a high pressure mode and the second chamber 32, in combination with the first chamber 30, can be utilized when the oil pump 12 is operating in a low pressure mode. Therefore, when the oil pump 12 is operating in the high pressure mode, the liquid fluid does not enter the second chamber 32 and any liquid fluid in the second chamber 32 drains from the second chamber 32 through an outlet 34 of the oil pump 12 and into the reservoir 14. It is to be appreciated that the outlet 34 and the reservoir 14 can be in fluid communication with each other utilizing one or more tubes or any other suitable component.

Generally, the high and low pressure modes are utilized when the liquid fluid is flowing through the oil pump 12. Therefore, the high and low pressure modes are utilized when the oil pump 12 is in the second phase to deliver the liquid fluid at the desired pressure to the desired components of the vehicle 10. Generally, the movable member 26 can include an outer periphery 36 facing the inner wall 24, with the first and second chambers 30, 32 disposed between the inner wall 24 of the housing 20 and the outer periphery 36 of the movable member 26.

Continuing with FIG. 3, the inner wall 24 of the housing 20 can define a recess 38 such that the inner wall 24 presents a base 40, a first end 42 and a second end 44, with the base 40 disposed between the first and second ends 42, 44. Generally, the recess 38 is disposed adjacent to the aperture 22 such that a portion of the movable member 26 is disposed in the recess 38. Specifically, the movable member 26 can include a slide 46 extending outwardly away from the outer periphery 36 such that the slide 46 is disposed in the recess 38. As such, the portion of the movable member 26 mentioned above can be the slide 46. The slide 46 extends from the outer periphery 36 of the movable member 26 toward the base 40 of the recess 38. The slide 46 is attached to the movable member 26 such that the slide 46 moves in unison with the movable member 26. The slide 46 is spaced from the base 40 to prevent engagement of the slide 46 with the base 40 during movement of the movable member 26. Generally, the slide 46 is disposed adjacent to one of the first and second ends 42, 44 of the inner wall 24.

The oil pump 12 can further include a biasing member 48 disposed in the recess 38 and engaging the slide 46 to continuously bias the slide 46 toward one of the first and second ends 42, 44. Specifically, the biasing member 48 engages one of the first and second ends 42, 44 and the slide 46. For example, in FIG. 3, the biasing member 48 continuously biases the slide 46 toward the first end 42. The biasing member 48 can be a coil spring or any other suitable biasing member.

Figure 4:
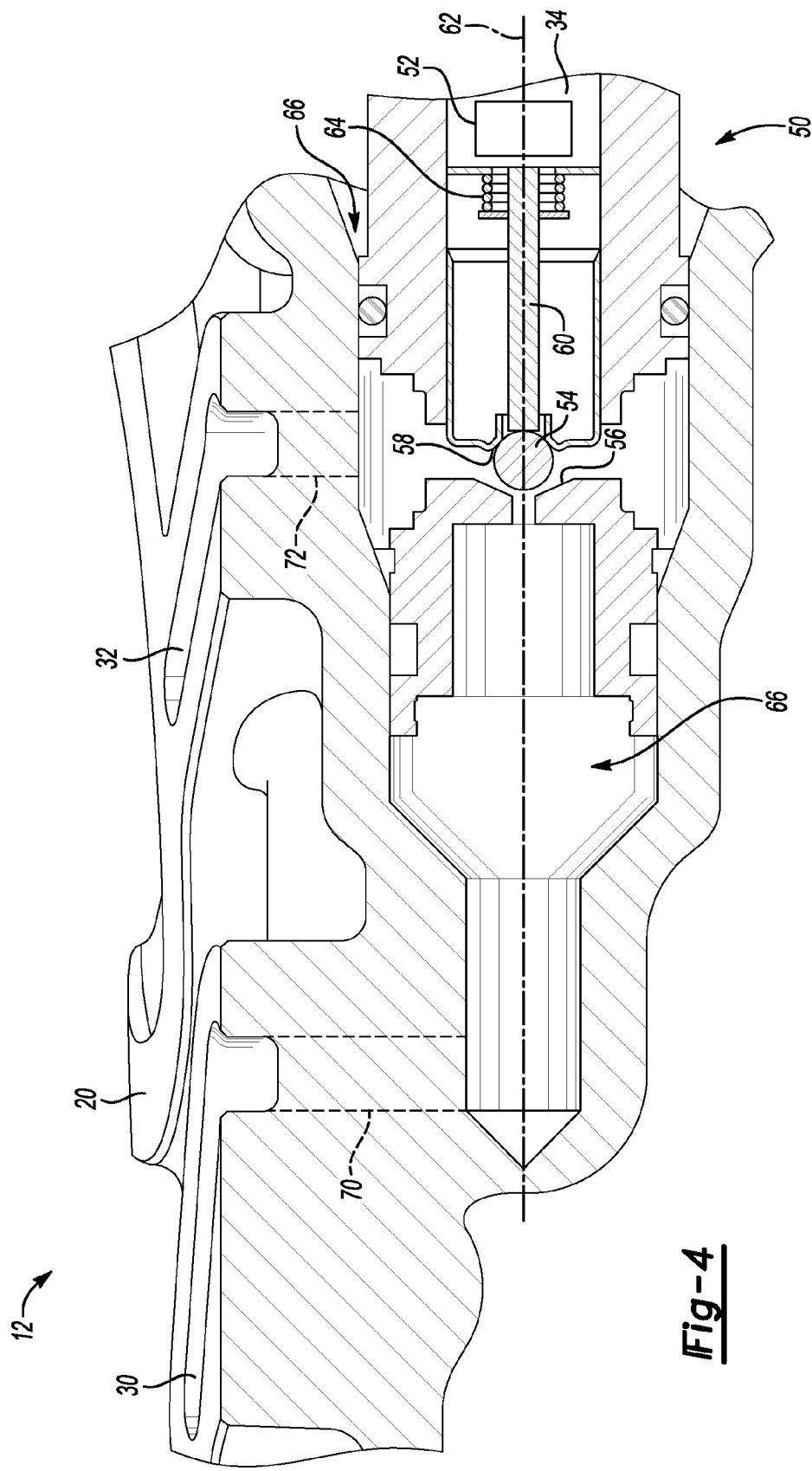
FIG. 4 is a schematic fragmentary cross-sectional view of the oil pump of FIG. 3 taken through the oil control valve, with a blocking member of the oil control valve engaging a first seat.
Figure 5:
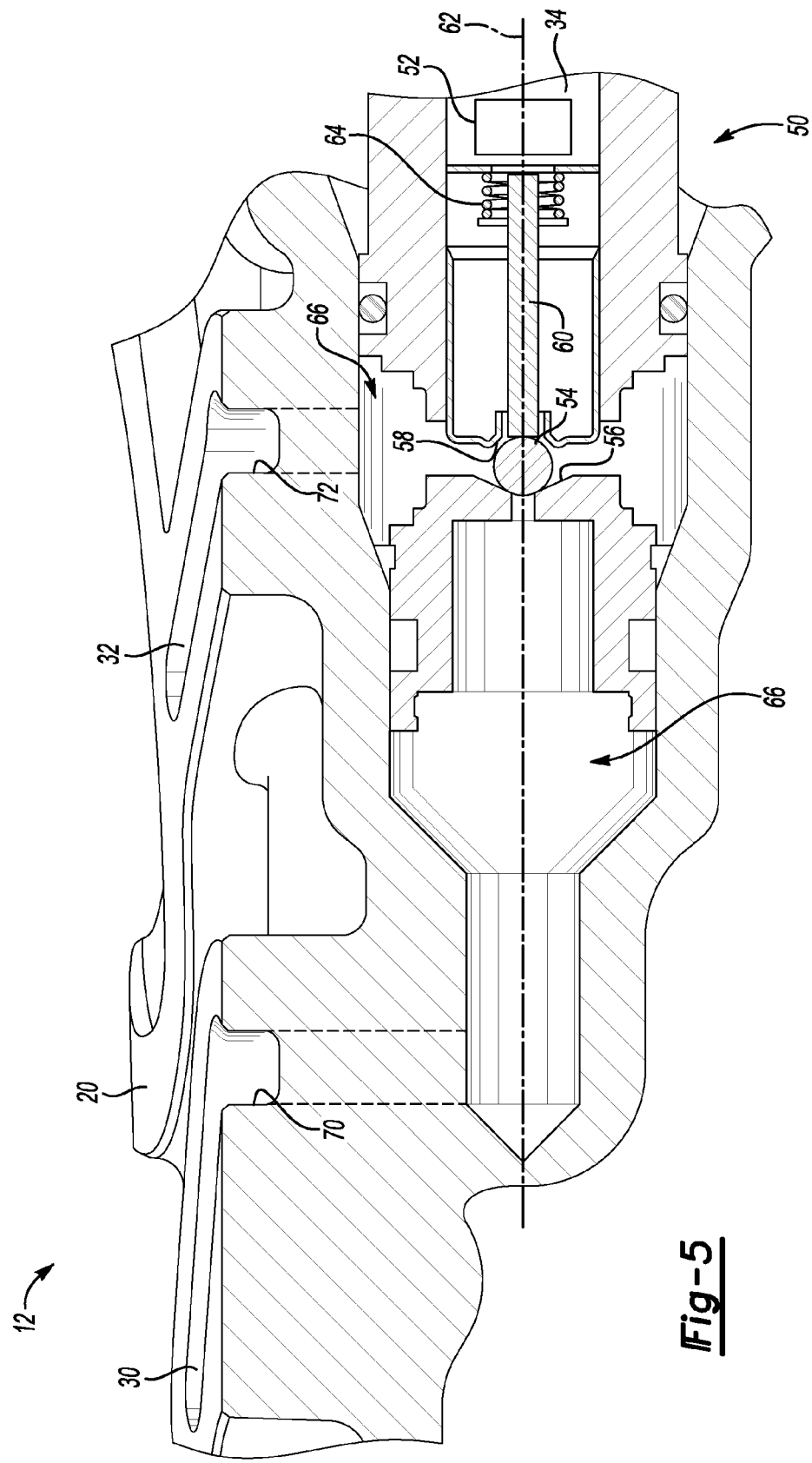
FIG. 5 is a schematic fragmentary cross-sectional view of the oil pump of FIGS. 3 and 4 taken through the oil control valve, with the blocking member engaging a second seat.

Referring to FIGS. 3-5, the pump 12 includes a control valve 50. In the oil pump 12 example herein, the control valve 50 can be an oil control valve 50, and for illustrative consistency, the below discussion refers to the control valve 50 as the oil control valve 50. Generally, the oil control valve 50 selectively allows the liquid fluid to flow into the second chamber 32. The oil control valve 50 operates in one of an initial operating mode and a standard operating mode when the oil pump 12 is activated. The initial operating mode occurs when the oil pump 12 is in the first phase such that the gaseous fluid is being expelled and the standard operating mode occurs when the oil pump 12 is in the second phase such that the liquid fluid is being pump through the oil pump 12. Simply stated, the initial operating mode occurs during the warm-up of the vehicle 10 and the standard operating mode occurs after warm-up of the vehicle 10. When the oil control valve 50 is operating in the standard operating mode, the oil control valve 50 is actuated to operate the oil pump 12 in one of the high pressure mode and the low pressure mode.

Continuing with FIGS. 4 and 5, the oil control valve 50 can include a solenoid 52 that is selectively energized. Specifically, the solenoid 52 can be energized and de-energized as desired. For example, when the oil control valve 50 is operating in the initial operating mode, the solenoid 52 is energized and de-energized in a sequence to reduce sound produced by the oil pump 12 as the gaseous fluid is removed from the oil pump 12. Energizing and de-energizing the solenoid 52 in the sequence reduces vibration of the slide 46 which reduces the sound produced by the oil pump 12 when in the initial operating mode, which is discussed further below. Furthermore, when the oil control valve 50 is operating in the standard operating mode, the solenoid 52 can be energized such that the oil pump 12 is operating in the low pressure mode and the solenoid 52 can be de-energized such that the oil pump 12 is operating in the high pressure mode.

Continuing with FIGS. 4 and 5, the oil control valve 50 can include a blocking member 54, a first seat 56 and a second seat 58. The first and second seats 56, 58 are spaced from each other, with the blocking member 54 disposed between the first and second seats 56, 58. The blocking member 54 selectively engages the first and second seats 56, 58. The blocking member 54 is movable when the oil control valve 50 is operating in either the initial operating mode or the standard operating mode, with the difference between these modes being whether the gaseous fluid is in the lines/oil pump 12. For example, when in the standard operating mode and the blocking member 54 engages the first seat 56, the oil pump 12 is in the high pressure mode such that the liquid fluid does not enter the second chamber 32. As another example, when in the standard operating mode and the blocking member 54 engages the second seat 58, the oil pump 12 is in the low pressure mode such that the liquid fluid enters the second chamber 32. Therefore, when the oil pump 12 is in the low pressure mode, the liquid fluid flows from the first chamber 30 into the oil control valve 50 and into the second chamber 32. As yet another example, when in the initial operating mode, the blocking member 54 engages the first and second seats 56, 58 in the sequence that reduces the sound produced by the oil pump 12 as the gaseous fluid is being expelled. FIG. 4 illustrates the blocking member 54 engaging the second seat 58 and FIG. 5 illustrates the blocking member 54 engaging the first seat 56.

The oil control valve 50 can further include a rod 60 operatively coupled to the solenoid 52. For example, when the solenoid 52 is energized, the rod 60 moves in one direction and when the solenoid 52 is de-energized, the rod 60 moves in another direction. As such, the rod 60 can move back and forth along a longitudinal axis 62. In one embodiment, when the solenoid 52 is energized, the rod 60 moves away from the first seat 56 such that the blocking member 54 engages the second seat 58 (see FIG. 4), and when the solenoid 52 is de-energized, the rod 60 moves away from the second seat 58 such that the blocking member 54 engages the first seat 56 (see FIG. 5). When the rod 60 moves toward the first seat 56, the rod 60 engages the blocking member 54 to move the blocking member 54 into engagement with the first seat 56. When the rod 60 moves away from the first seat 56, pressure from the liquid fluid flowing along the longitudinal axis 62 toward the second seat 58 moves the blocking member 54 into engagement with the second seat 58, thus preventing the liquid fluid from flowing out the outlet 34 and into the reservoir 14. A return 64 can be utilized to move the rod 60 toward the first seat 56 when the solenoid 52 is de-energized. It is to be appreciated that the rod 60 can be a pintle and the return 64 can be a spring or any other suitable return.

Referring to FIGS. 3-5, the housing 20 of the oil pump 12 defines a cavity 66 spaced from the aperture 22 to receive the oil control valve 50. Therefore, the housing 20 supports the oil control valve 50. Generally, the cavity 66 is in fluid communication with the first and second chambers 30, 32. Therefore, for example, when the oil pump 12 is in the second phase, the liquid fluid flows from the reservoir 14 through an inlet 68 of the oil pump 12, through the engine 16, back into the oil pump 12 through the first chamber 30 and into the cavity 66 of the housing 20.

Continuing with FIGS. 4 and 5, the housing 20 defines a first passageway 70 and a second passageway 72 spaced from each other. Specifically, the first passageway 70 is disposed between the first chamber 30 and the cavity 66, with the first passageway 70 in fluid communication with both the first chamber 30 and the cavity 66. Furthermore, the second passageway 72 is disposed between the second chamber 32 and the cavity 66, with the second passageway 72 in fluid communication with both the second chamber 32 and the cavity 66. The first and second seats 56, 58 are disposed between the first and second passageways 70, 72 such that the blocking member 54 selectively allows fluid communication with the second chamber 32. Therefore, when the oil pump 12 is in the high pressure mode, the blocking member 54 engages the first seat 56 such that the liquid fluid cannot enter the second chamber 32 and cannot be drained, expelled or purged through the outlet 34 into the reservoir 14. Furthermore, when the oil pump 12 is in the high pressure mode, any liquid fluid in the second chamber 32 drains into the reservoir 14. When the oil pump 12 is in the low pressure mode, the blocking member 54 engages the second seat 58 such that the liquid fluid fills the second chamber 32 and cannot be drained, expelled or purged through the outlet 34 into the reservoir 14.

Figure 6:
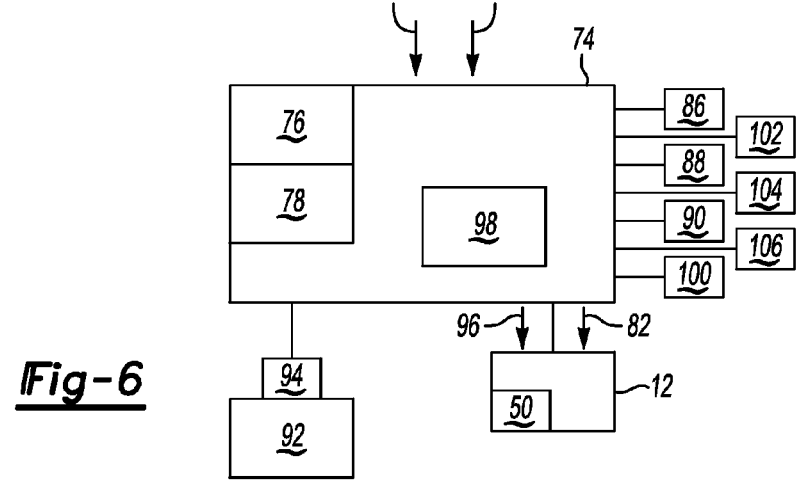
FIG. 6 is a schematic illustration of a controller in communication with the pump such as the oil pump shown in FIGS. 3-5.

Turning to FIG. 6, the vehicle 10 further includes a controller 74 in communication with the oil pump 12. The controller 74 can be part of an electronic control module, e.g., an engine control module. The controller 74 includes a processor 76 and a memory 78 on which is recorded instructions for reducing the sound produced by the oil pump 12. The controller 74 is configured to execute the instructions from the memory 78, via the processor 76. For example, the controller 74 can be a host machine or distributed system, e.g., a computer such as a digital computer or microcomputer, acting as a vehicle control module, and/or as a proportional-integral-derivative (PID) controller device having a processor, and, as the memory 78, tangible, non-transitory computer-readable memory such as read-only memory (ROM) or flash memory. The controller 74 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 74 can include all software, hardware, memory 78, algorithms, connections, sensors, etc., necessary to monitor and control the oil pump 12/oil control valve 50. As such, a control method operative to reduce the sound produced by the oil pump 12 can be embodied as software or firmware associated with the controller 74. It is to be appreciated that the controller 74 can also include any device capable of analyzing data from various sensors, comparing data, making the necessary decisions required to control and monitor the oil pump 12/oil control valve 50.

When the gaseous fluid moves through the oil pump 12 when in the first phase, the slide 46 inside the oil pump 12 can bias back and forth between one of the first and second ends 42, 44 and the biasing member 48, thus causing vibration which can create the sound that can be heard in the vehicle 10. Therefore, the present disclosure also provides a method 1000 of reducing the sound produced by the oil pump 12, which can reduce the sound in the vehicle 10 (see FIG. 7). Specifically, the method 1000 can reduce vibration of the slide 46 which reduces the sound created in the oil pump 12 when the oil pump 12 is in the first phase.

The method 1000 includes detecting 1002, via the controller 74, a predetermined event 80. In one embodiment, detecting 1002 the predetermined event 80 can include detecting a key-on event. For example, the key-on event can be when the vehicle 10 is started or turned on. It is to be appreciated, depending on the application of the pump 12 is being utilized, the predetermined event 80 can be different than a key-on event, and another example of the predetermined event 80 is power or current being supplied to the pump 12.

The method 1000 also includes activating 1004, via the controller 74, the oil pump 12 when the predetermined event 80 is detected. For example, the oil pump 12 can be activated when the key-on event occurs, i.e., starting the vehicle 10. As discussed above, the oil pump 12 contains the gaseous fluid when in the first phase and contains the liquid fluid when in the second phase. Therefore, when the vehicle 10 is started, the phase that the oil pump 12 will be operating in will depend on various parameters, as discussed below.

The method 1000 also includes operating 1006 the oil control valve 50 of the oil pump 12 in one of the initial operating mode and the standard operating mode when the oil pump 12 is activated. The oil control valve 50 is operable to allow the gaseous fluid to vent out of the oil pump 12 when in the initial operating mode corresponding to the oil pump 12 being in the first phase. Furthermore, the oil control valve 50 is operable to allow the liquid fluid to move through the oil pump 12 when in the standard operating mode corresponding to the oil pump 12 being in the second phase. Therefore, the controller 74 communicates to the oil control valve 50 to operate in one of the initial and standard operating modes. The oil control valve 50 operates in the standard operating mode when the oil pump 12 is functioning to pump the liquid fluid through various components, such as the engine 16 or transmission as discussed above. The oil control valve 50 operates in the initial operating mode while the gaseous fluid is still in the oil pump 12.

The method 1000 further includes energizing and de-energizing 1008, at a calibrated frequency 82 (see FIG. 6), via the controller 74, the solenoid 52 of the oil control valve 50 in the sequence when in the initial operating mode to reduce the sound produced by the oil pump 12 during the initial operating mode. In other words, when the gaseous fluid is being expelled from the oil pump 12, the solenoid 52 is energized and de-energized in the sequence which reduces sound in the vehicle 10, and more specifically, reduces sound produced by the oil pump 12. Specifically, by energizing and de-energizing 1008 the solenoid 52 in the sequence, vibration of the slide 46 is reduced which reduces sound produced by the oil pump 12. Simply stated, the oil pump 12 is cycled on and off when in the initial operating mode to reduce the sound during the warm-up of the vehicle 10. In other words, the solenoid 52 is cycled on and off when in the initial operating mode to reduce vibration of the slide 46 inside the oil pump 12 during the warm-up of the vehicle 10.

In certain embodiments, the method 1000 can further include communicating 1010 a vehicle operating parameter 84 (see FIG. 6) to the controller 74 when the predetermined event 80 is detected. In other words, the controller 74 is configured to receive the vehicle operating parameter 84 when the predetermined event 80 is detected. Therefore, operating 1006 the oil control valve 50 can include selecting, via the controller 74, one of the initial operating mode and the standard operating mode based on the vehicle operating parameter 84. Generally, communicating 1010 the vehicle operating parameter 84 to the controller 74 occurs before operating 1006 the oil control valve in one of the initial and standard operating modes.

In one embodiment, the vehicle operating parameter 84 can include an oil temperature and the method 1000 can further include measuring 1012 the oil temperature. As such, communicating 1010 the vehicle operating parameter 84 to the controller 74 can include communicating the measured oil temperature to the controller 74. The oil temperature can be measured by a first sensor 86 (see FIG. 6) in communication with the controller 74 or any other suitable measuring device. Generally, the oil temperature is taken from the temperature of the liquid fluid, e.g., oil. For example, the oil temperature can be measured from the liquid fluid in the reservoir 14 or any other suitable location.

In another embodiment, the vehicle operating parameter 84 can include a coolant temperature and the method 1000 can also include measuring 1014 the coolant temperature. As such, communicating 1010 the vehicle operating parameter 84 to the controller 74 can include communicating the measured coolant temperature to the controller 74. The coolant temperature can be measured by a second sensor 88 (see FIG. 6) in communication with the controller 74 or any other suitable measuring device. Generally, the coolant temperature is taken from the temperature of a coolant fluid. For example, the coolant temperature can be measured from the coolant fluid stored in a coolant reservoir 89 or any other suitable location.

In yet another embodiment, the vehicle operating parameter 84 can include an intake air temperature and the method 1000 can further include measuring 1016 the intake air temperature. As such, communicating 1010 the vehicle operating parameter 84 to the controller 74 can include communicating the measured intake air temperature to the controller 74. The intake air temperature can be measured by a third sensor 90 (see FIG. 6) in communication with the controller 74 or any other suitable measuring device. Generally, the intake air temperature is taken from the engine 16 or any other suitable location.

In another embodiment, the vehicle operating parameter 84 can include a voltage of a battery 92 (see FIG. 6) and the method 1000 can also include measuring 1018 the voltage of the battery 92. As such, communicating 1010 the vehicle operating parameter 84 to the controller 74 can include communicating the measured voltage of the battery 92 to the controller 74. The voltage can be measured by a fourth sensor 94 (see FIG. 6) in communication with the controller 74 or any other suitable measuring device. Generally, the battery 92 can be a twelve volt battery or any other suitable battery having the desired voltage. It is to be appreciated that, for example, during the key-on event, the voltage can vary.

In yet another embodiment, the vehicle operating parameter 84 can include a total time since the vehicle 10 was turned off and the next predetermined event 80 (i.e., the next key-on event). For example, the total time since the vehicle 10 was turned off and the next predetermined event 80 can be the total time since the vehicle 10 was turned off and the next time that the vehicle 10 is restarted. The method 1000 can further include measuring 1019 the total time since the vehicle 10 was turned off and the next predetermined event 80. As such, communicating 1010 the vehicle operating parameter 84 to the controller 74 can include communicating to the controller 74 the measured total time since the vehicle 10 was turned off and the next predetermined event 80. The total time since the vehicle 10 was turned off and the next predetermined event 80 can be measured by a fifth sensor 100 (see FIG. 6) in communication with the controller 74 or any other suitable measuring device. Generally, the total time since the vehicle 10 was shut off and turned back on is taken from the engine 16, ignition switch or any other suitable location.

Furthermore, in another embodiment, the vehicle operating parameter 84 can include engine torque. For example, the engine torque can be based on air flow, fuel flow, spark timing, and/or combinations thereof. In one embodiment, the engine torque is based on air flow and spark timing. In another embodiment, the engine torque is based on fuel flow. The method 1000 can further include measuring 1021 the engine torque. As such, communicating 1010 the vehicle operating parameter 84 to the controller 74 can include communicating to the controller 74 the measured engine torque. The air flow can be measured by a sixth sensor 102 (see FIG. 6) in communication with the controller 74 or any other suitable measuring device. Furthermore, the fuel flow can be measured by a seventh sensor 104 (see FIG. 6) in communication with the controller 74 or any other suitable measuring device. Additionally, the spark timing can be measured by an eighth sensor 106 (see FIG. 6) in communication with the controller 74 or any other suitable measuring device. It is to be appreciated that engine torque can be based on other inputs as well.

In certain embodiments, the vehicle operating parameter 84 is further defined as a plurality of vehicle operating parameters 84. As such, in certain embodiments, communicating 1010 the vehicle operating parameter 84 can include communicating the vehicle operating parameters 84 to the controller 74 when the predetermined event 80 is detected. In other words, the controller 74 is configured to receive the vehicle operating parameters 84 when the predetermined event 80 is detected. The vehicle operating parameters 84 can include the oil temperature, the coolant temperature, the intake air temperature, the voltage of the battery 92, or any combination thereof. Therefore, in one embodiment, the method 1000 can further include measuring 1020 each of the oil temperature, the coolant temperature, the intake air temperature and the voltage of the battery 92. Furthermore, in this embodiment, communicating the vehicle operating parameters 84 to the controller 74 can include communicating each of the measured oil temperature, the measured coolant temperature, the measured intake air temperature and the measured voltage of the battery 92 to the controller 74. In other words, the controller 74 is configured to receive each of the oil temperature, the coolant temperature, the intake air temperature and the voltage of the battery 92. In this embodiment, operating 1006 the oil control valve 50 can include selecting, via the controller 74, one of the initial operating mode and the standard operating mode based on the vehicle operating parameters 84. Furthermore, the vehicle operating parameters 84 can include the total time since the vehicle 10 was turned off and the next predetermined event 80, the engine torque, in addition to the parameters 84 discussed above, or any combination thereof.

The method 1000 can also include extracting 1022 a valve operating parameter 96 (see FIG. 6) for the solenoid 52 from a look-up table 98 based on the vehicle operating parameter 84 when the oil control valve 50 is in the initial operating mode. Generally, controller 74 extracts the valve operating parameter 96 from the look-up table 98. The look-up table 98 can be populated using numeric data obtained either through empirical testing or through analytic formulation.

In certain embodiments, extracting 1022 the valve operating parameter 96 for the solenoid 52 from the look-up table 98 can include extracting the valve operating parameter 96 for the solenoid 52 from the look-up table 98 based on each of the vehicle operating parameters 84 when the oil control valve 50 is in the initial operating mode. As such, extracting 1022 the valve operating parameter 96 for the solenoid 52 from the look-up table 98 can be based on the oil temperature, the coolant temperature, the intake air temperature, the voltage of the battery 92, or any combination thereof. Generally, extracting 1022 the valve operating parameter for the solenoid 52 from the look-up table 98 based on the vehicle operating parameter 84 when the oil control valve 50 is in the initial operating mode occurs before energizing and de-energizing 1008 the solenoid 52 of the oil control valve 50 in the sequence when in the initial operating mode.

Additionally, the method 1000 can include communicating 1024, via the controller 74, the valve operating parameter 96 to the oil control valve 50 to energize and de-energize the solenoid 52 in the sequence when in the initial operating mode. Generally, communicating 1024, via the controller 74, the valve operating parameter 96 to the oil control valve 50 when in the initial operating mode occurs before energizing and de-energizing 1008 the solenoid 52 of the oil control valve 50 in the sequence when in the initial operating mode.

In one embodiment, the valve operating parameter 96 can include an electrical signal having the frequency 82 to energize and de-energize the solenoid 52 in the sequence. Therefore, extracting 1022 the valve operating parameter 96 from the look-up table 98 can include extracting the electrical signal having the frequency 82 from the look-up table 98 based on the vehicle operating parameter 84 when the oil control valve 50 is in the initial operating mode. With regard to extracting the electrical signal having the frequency 82 from the look-up table 98, this refers to extracting the information that describes the electrical signal, such as for example, the waveform, e.g., the frequency 82, amplitude, wavelength, etc.; and thus, the look-up table 98 can retain the information that describes the electrical signal. As such, simply stated, extracting 1022 the valve operating parameter 96 from the look-up table 98 can include extracting the frequency 82 from the look-up table 98 based on the vehicle operating parameter 84 when the oil control valve 50 is in the initial operating mode. In certain embodiments, the frequency 82 is from about 0.25 hertz (Hz) to about 25.0 Hz. More specifically, in certain embodiments, the frequency 82 is from about 1.0 Hz to about 10.0 Hz. As one example, the frequency 82 can be about 2.0 Hz. As another example, the frequency 82 can be about 3.0 Hz. It is to be appreciated that the frequency 82 can be other values than identified above. Furthermore, communicating 1024, via the controller 74, the valve operating parameter 96 can include communicating, via the controller 74, the electrical signal to energize and de-energize the solenoid 52 in the sequence when in the initial operating mode.

In another embodiment, the valve operating parameter 96 can include a duty cycle of the solenoid 52. Therefore, extracting 1022 the valve operating parameter 96 from the look-up table 98 can include extracting the duty cycle of the solenoid 52 from the look-up table 98 based on the vehicle operating parameter 84 when the oil control valve 50 is in the initial operating mode. Furthermore, communicating 1024, via the controller 74, the valve operating parameter 96 can include communicating, via the controller 74, the duty cycle of the solenoid 52 when in the initial operating mode. In certain embodiments, the duty cycle is greater than 0 percent (%) and less than 100%. More specifically, in certain embodiments, the duty cycle is from about 25% to about 75%. As one example, the duty cycle can be about 50%.

In yet another embodiment, the valve operating parameter 96 can include a total time of the sequence. Therefore, extracting 1022 the valve operating parameter 96 from the look-up table 98 can include extracting the total time of the sequence from the look-up table 98 based on the vehicle operating parameter 84 when the oil control valve 50 is in the initial operating mode. Furthermore, communicating 1024, via the controller 74, the valve operating parameter 96 can include communicating, via the controller 74, the total time that the solenoid 52 is energized and de-energized in the sequence when in the initial operating mode. In certain embodiments, the total time of the sequence is greater than 0 seconds (s) to about 20 s. More specifically, in certain embodiments, the total time of the sequence is from about 2.0 s to about 10.0 s. As one example, the total time can be about 3.0 s. As another example, the total time can be about 7.0 s. It is to be appreciated that the total time can be other values than identified above.

In certain embodiments, the valve operating parameter 96 is further defined as a plurality of valve operating parameters 96. As such, in certain embodiments, extracting 1022 the valve operating parameter 96 for the solenoid 52 from the look-up table 98 can include extracting the valve operating parameters 96 for the solenoid 52 from the look-up table 98 based on one or more of the vehicle operating parameters 84 when the oil control valve 50 is in the initial operating mode. Generally, the controller 74 extracts the valve operating parameters 96 from the look-up table 98. As such, extracting the valve operating parameters 96 for the solenoid 52 from the look-up table 98 can include the electrical signal to energize and de-energize the solenoid 52 in the sequence when in the initial operating mode, the duty cycle of the solenoid 52 when in the initial operating mode and the total time that the solenoid 52 is energized and de-energized in the sequence when in the initial operating mode, or any combination thereof.

Furthermore, in certain embodiments, communicating 1024, via the controller 74, the valve operating parameter 96 can include communicating the valve operating parameters 96 to the oil control valve 50 to energize and de-energize the solenoid 52 in the sequence when in the initial operating mode. The valve operating parameters 96 can include the electrical signal to energize and de-energize the solenoid 52 in the sequence, the duty cycle of the solenoid 52, the total time of the sequence, or any combination thereof. Therefore, in one embodiment, communicating, via the controller 74, the valve operating parameters 96 can include communicating, via the controller 74, each of the electrical signal to energize and de-energize the solenoid 52 in the sequence when in the initial operating mode, the duty cycle of the solenoid 52 when in the initial operating mode and the total time that the solenoid 52 is energized and de-energized in the sequence when in the initial operating mode.

The method 1000 can also include moving 1026 the blocking member 54 of the oil control valve 50 when the solenoid 52 is energized and de-energized in the sequence when in the initial operating mode. More specifically, moving 1026 the blocking member 54 can include engaging the first seat 56 of the oil control valve 50 with the blocking member 54 when the solenoid 52 is de-energized such that the blocking member 54 is spaced from the second seat 58 of the oil control valve 50, and engaging the second seat 58 with the blocking member 54 when the solenoid 52 is energized such that the blocking member 54 is spaced from the first seat 56. The blocking member 54 selectively engages the first and second seats 56, 58 when operating in the initial operating mode and the standard operating mode as discussed above.

When the oil control valve 50 is operating in the initial operating mode, the gaseous fluid is being vented, expelled or purged from the first and second chambers 30, 32 and out of the oil pump 12. Specifically, the gaseous fluid is being vented out of the outlet 34 of the oil pump 12 when in the initial operating mode utilizing the above method 1000 which reduces movement of the slide 46 inside the oil pump 12, thus reducing the sound produced inside the oil pump 12 during this initial operating mode. When the oil control valve 50 is operating in the initial operating mode and the oil pump 12 is in the first phase, the blocking member 54 moves back and forth to selectively engage the first and second seats 56, 58, the gaseous fluid is periodically vented/expelled out of the oil control valve 50 through the outlet 34 and into the reservoir 14. Once the gaseous fluid is vented/expelled out of the oil pump 12, the oil control valve 50 will operate in the standard operating mode. As such, when the oil control valve 50 is operating in the standard operating mode and the oil pump 12 is in the second phase, engagement of the blocking member 54 with the first seat 56 prevents the liquid fluid from entering the second chamber 32 such that the oil pump 12 functions in the high pressure mode as discussed in detail above. Additionally, when the oil control valve 50 is operating in the standard operating mode and the oil pump 12 is in the second phase, engagement of the blocking member 54 with the second seat 58 allows the liquid fluid to enter the second chamber 32 such that the oil pump 12 functions in the low pressure mode as discussed in detail above.

Figure 7:
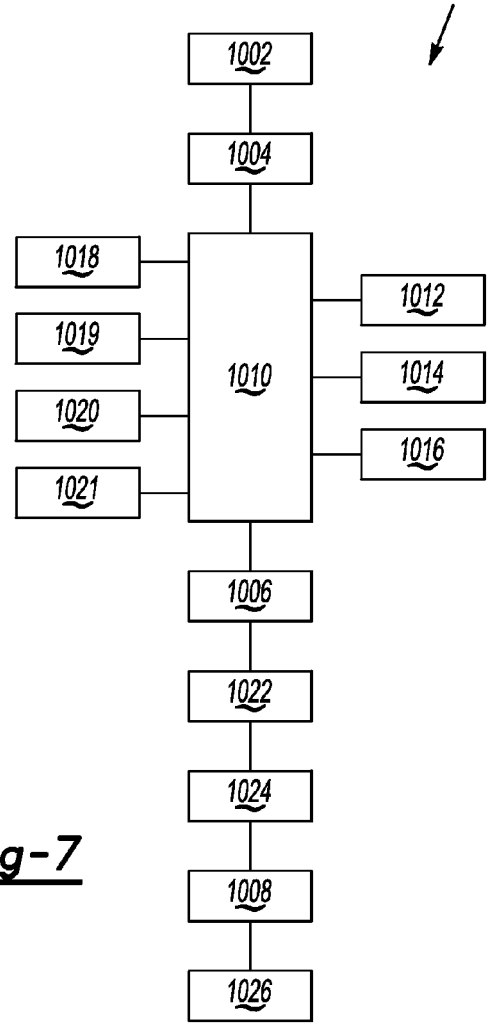
FIG. 7 is a schematic flow chart of a method of reducing sound produced by the pump shown in FIGS. 3-5.

It is to be appreciated that the order or sequence of performing the method 1000 as identified in the flowchart of FIG. 7 is for illustrative purposes and other orders or sequences are within the scope of the present disclosure. It is to also be appreciated that the method 1000 can include other features not specifically identified in the flowchart of FIG. 7.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of reducing sound produced by a liquid fluid pump, the method comprising:
   detecting, via a controller, a predetermined event;
   activating, via the controller, the pump when the predetermined event is detected, wherein the pump contains a gaseous fluid when in a first phase of the pump and a liquid fluid when in a second phase of the pump;
   operating a control valve of the pump in one of an initial operating mode and a standard operating mode when the pump is activated, with the control valve operable to allow the gaseous fluid to vent out of the pump when in the initial operating mode corresponding to the pump being in the first phase, and with the control valve operable to allow the liquid fluid to move through the pump when in the standard operating mode corresponding to the pump being in the second phase; and energizing and de-energizing, at a calibrated frequency, via the controller, a solenoid of the control valve in a sequence which cycles the solenoid on and off when in the initial operating mode to reduce the sound produced by the pump during the initial operating mode;

moving a rod of the control valve back and forth in response to the solenoid being energized and de-energized, at the calibrated frequency, in the sequence when in the initial operating mode;

moving a blocking member of the control valve back and forth in response to the movement of the rod when in the initial operating mode such that the blocking member controls a rate that the gaseous fluid is vented from the pump as the solenoid is cycled on and off while in the initial operating mode; and operating the control valve in the standard operating mode when the gaseous fluid has been vented from the pump in the initial operating mode.

2. A method as set forth in claim 1 wherein moving the blocking member includes engaging a first seat of the control valve with the blocking member when the solenoid is de-energized such that the blocking member is spaced from a second seat of the control valve, and engaging the second seat with the blocking member when the solenoid is energized such that the blocking member is spaced from the first seat.

3. A method as set forth in claim 1 wherein detecting the predetermined event includes detecting a key-on event.

4. A method as set forth in claim 1:
wherein the pump includes a housing defining an aperture such that the housing presents an inner wall adjacent to the aperture, and the pump includes a movable member disposed in the aperture;
wherein the inner wall defines a recess disposed adjacent to the aperture;
wherein the pump includes a biasing member disposed in the recess;
wherein the movable member includes a slide extending outwardly toward the inner wall such that the slide is at least partially disposed in the recess, and the slide is movable in the recess;
wherein the biasing member continuously biases the slide in a direction; and
minimizing movement of the slide relative to the biasing member while controlling the rate the gaseous fluid is vented from the pump as the solenoid is cycled on and off when in the initial operating mode to reduce the sound produced by the pump during the initial operating mode.

5. A method as set forth in claim 1 wherein the pump is utilized with a vehicle and further comprising:
communicating a vehicle operating parameter to the controller when the predetermined event is detected; and
wherein operating the control valve includes selecting, via the controller, one of the initial operating mode and the standard operating mode based on the vehicle operating parameter.

6. A method as set forth in claim 5:
wherein the vehicle operating parameter includes an oil temperature;
further comprising measuring the oil temperature; and
wherein communicating the vehicle operating parameter to the controller includes communicating the measured oil temperature to the controller.

7. A method as set forth in claim 5:
wherein the vehicle operating parameter includes a coolant temperature;
further comprising measuring the coolant temperature; and
wherein communicating the vehicle operating parameter to the controller includes communicating the measured coolant temperature to the controller.

8. A method as set forth in claim 5:
wherein the vehicle operating parameter includes an intake air temperature;
further comprising measuring the intake air temperature; and
wherein communicating the vehicle operating parameter to the controller includes communicating the measured intake air temperature to the controller.

9. A method as set forth in claim 5:
wherein the vehicle operating parameter includes a voltage of a battery;
further comprising measuring the voltage of the battery; and
wherein communicating the vehicle operating parameter to the controller includes communicating the measured voltage of the battery to the controller.

10. A method as set forth in claim 5 further comprising extracting a valve operating parameter for the solenoid from a look-up table based on the vehicle operating parameter when the control valve is in the initial operating mode.

11. A method as set forth in claim 10 further comprising communicating, via the controller, the valve operating parameter to the control valve to energize and de-energize the solenoid in the sequence when in the initial operating mode.

12. A method as set forth in claim 11 wherein:
the valve operating parameter includes an electrical signal having the frequency to energize and de-energize the solenoid in the sequence; and
communicating, via the controller, the valve operating parameter includes communicating, via the controller, the electrical signal to energize and de-energize the solenoid in the sequence when in the initial operating mode.

13. A method as set forth in claim 11 wherein:
the valve operating parameter includes a duty cycle of the solenoid; and
communicating, via the controller, the valve operating parameter includes communicating, via the controller, the duty cycle of the solenoid when in the initial operating mode.

14. A method as set forth in claim 11 wherein:
the valve operating parameter includes a total time of the sequence; and
communicating, via the controller, the valve operating parameter includes communicating, via the controller, the total time that the solenoid is energized and de-energized in the sequence when in the initial operating mode.

15. A method as set forth in claim 11 wherein:
the vehicle operating parameter is further defined as a plurality of vehicle operating parameters;
communicating the vehicle operating parameter includes communicating the vehicle operating parameters to the controller when the predetermined event is detected; and extracting the valve operating parameter for the solenoid from the look-up table includes extracting the valve operating parameter for the solenoid from the look-up table based on each of the vehicle operating parameters when the control valve is in the initial operating mode.

16. A method as set forth in claim 15:
wherein the vehicle operating parameters include an oil temperature, a coolant temperature, an intake air temperature and a voltage of a battery;
further comprising measuring each of the oil temperature, the coolant temperature, the intake air temperature and the voltage of the battery;
communicating the vehicle operating parameters to the controller includes communicating each of the measured oil temperature, the measured coolant temperature, the measured intake air temperature and the measured voltage of the battery to the controller;
the valve operating parameter is further defined as a plurality of valve operating parameters;
the valve operating parameters include an electrical signal having the frequency to energize and de-energize the solenoid in the sequence, a duty cycle of the solenoid and a total time of the sequence; and
communicating, via the controller, the valve operating parameters include communicating, via the controller, each of the electrical signal to energize and de-energize the solenoid in the sequence when in the initial operating mode, the duty cycle of the solenoid when in the initial operating mode and the total time that the solenoid is energized and de-energized in the sequence when in the initial operating mode.

17. A vehicle comprising:
a liquid fluid pump including a control valve, with the control valve including a solenoid,
wherein the pump includes a housing defining an aperture such that the housing presents an inner wall adjacent to the aperture, and the pump includes a movable member disposed in the aperture;
wherein the inner wall defines a recess disposed adjacent to the aperture;
wherein the pump includes a biasing member disposed in the recess;
wherein the movable member includes a slide extending outwardly toward the inner wall such that the slide is at least partially disposed in the recess, and the slide is movable in the recess;
wherein the biasing member continuously biases the slide in a direction;
wherein the pump contains a gaseous fluid when in a first phase of the pump and a liquid fluid when in a second phase of the pump; and
a controller in communication with the pump, with the controller including a processor and tangible, non-transitory memory on which is recorded instructions for reducing sound produced by the pump, wherein the controller is configured to execute the instructions from the memory, via the processor, to thereby:
detect a predetermined event;
activate the pump when the predetermined event is detected;
operate the control valve of the pump in one of an initial operating mode and a standard operating mode when the pump is activated, with the control valve operable to allow the gaseous fluid to vent out of the pump when in the initial operating mode corresponding to the pump being in the first phase, and with the control valve operable to allow the liquid fluid to move through the pump when in the standard operating mode corresponding to the pump being in the second phase; and
energize and de-energize, at a calibrated frequency, the solenoid of the control valve in a sequence when in the initial operating mode to reduce sound produced by the pump during the initial operating mode;
wherein the control valve includes a rod movable back and forth in response to the solenoid being energized and de-energized, at the calibrated frequency, in the sequence when in the initial operating mode;
wherein the control valve includes a blocking member movable back and forth in response to the movement of the rod when in the initial operating mode such that the blocking member controls a rate that the gaseous fluid is vented from the pump as the solenoid is cycled on and off while in the initial operating mode; and
wherein the control valve operates in the standard operating mode when the gaseous fluid has been vented from the pump in the initial operating mode.

18. A vehicle as set forth in claim 17 wherein:
the controller is configured to receive a plurality of vehicle operating parameters when the predetermined event is detected; and
the controller being configured to operate the control valve further includes the controller being configured to select one of the initial operating mode and the standard operating mode based on the vehicle operating parameters.

19. A vehicle as set forth in claim 18 wherein:
the controller is configured to extract a plurality of valve operating parameters for the solenoid from a look-up table based on the vehicle operating parameters when the control valve is in the initial operating mode; and
the controller is configured to communicate the valve operating parameters to the control valve to energize and de-energize the solenoid in the sequence when in the initial operating mode.

20. A vehicle as set forth in claim 19 wherein:
the vehicle operating parameters include an oil temperature, a coolant temperature, an intake air temperature and a voltage of a battery;
the controller being configured to receive the vehicle operating parameters further includes the controller being configured to receive each of the oil temperature, the coolant temperature, the intake air temperature and the voltage of the battery;
the valve operating parameters include an electrical signal having the frequency to energize and de-energize the solenoid in the sequence, a duty cycle of the solenoid and a total time of the sequence;
the controller being configured to communicate the valve operating parameters further includes the controller being configured to communicate each of the electrical signal to energize and de-energize the solenoid in the sequence when in the initial operating mode, the duty cycle of the solenoid when in the initial operating mode and the total time that the solenoid is energized and de-energized in the sequence when in the initial operating mode.

* * * * *